(12) United States Patent
Danko et al.

(10) Patent No.: US 11,408,401 B2
(45) Date of Patent: Aug. 9, 2022

(54) ROBOTIC ACCESS SYSTEM INCLUDING ROBOTIC FAN CRAWLER FOR WIND BLADE INSPECTION AND MAINTENANCE

(71) Applicant: General Electric Company, Schenectady, NY (US)

(72) Inventors: Todd William Danko, Niskayuna, NY (US); Judith Ann Guzzo, Niskayuna, NY (US); John Robert Hoare, Latham, NY (US); Yakov Polishchuk, Niskayuna, NY (US); Douglas Forman, Niskayuna, NY (US); Shiraj Sen, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 255 days.

(21) Appl. No.: 16/381,169

(22) Filed: Apr. 11, 2019

(65) Prior Publication Data

US 2020/0325878 A1 Oct. 15, 2020

(51) Int. Cl.
*F03D 80/50* (2016.01)
*B62D 57/024* (2006.01)

(52) U.S. Cl.
CPC ........... *F03D 80/50* (2016.05); *B62D 57/024* (2013.01)

(58) Field of Classification Search
CPC ....... B62D 57/024; F03D 80/50; F03D 17/00; B08B 1/008
See application file for complete search history.

(56) References Cited

U.S. PATENT DOCUMENTS 4,926,957 A * 5/1990 Urakami .............. B62D 57/024
114/222
5,194,032 A * 3/1993 Garfinkel ............. A63H 17/004
180/164

(Continued)

FOREIGN PATENT DOCUMENTS

CN 103499583 A 1/2014
CN 203581164 U 5/2014

(Continued)

OTHER PUBLICATIONS

Jeon et al., "Maintenance Robot for Wind Power Blade Cleaning", 29th International Symposium of Automation and Robotics in Construction, ISARC 2012, Conference location: Eindhoven, Netherlands, pp. 1-5, Dec. 1, 2012.

(Continued)

*Primary Examiner* — Jacob J Cigna
(74) *Attorney, Agent, or Firm* — Dority & Manning, P.A.

(57) ABSTRACT

A robotic access system including a robotic fan crawler configured to traverse a surface of a wind turbine and perform one or more tasks. The robotic fan crawler includes one or more fans to adhere the robotic fan crawler to the surface of the wind turbine and one or more driving components to drive the robotic fan crawler along the surface of the wind turbine. The robotic fan crawler further includes one or more omnidirectional cameras operable to capture images of the surface from multiple perspectives during an inspection activity and data collection period. One or more steering components provide directional changes of the robotic fan crawler during operation. A tether cable is coupled to the robotic fan crawler and a tether management system to provide one or more of power, communications, grounding, supplies and distance calculations.

7 Claims, 6 Drawing Sheets

(56) References Cited

U.S. PATENT DOCUMENTS

| | | | | |
|---|---|---|---|---|
| 6,053,267 | A | * | 4/2000 | Fisher .................... B08B 3/024 |
| | | | | 180/164 |
| 7,520,356 | B2 | * | 4/2009 | Sadegh ............. B62D 49/0621 |
| | | | | 180/127 |
| 7,980,916 | B2 | * | 7/2011 | Clark, Jr. ............... A63H 30/04 |
| | | | | 446/454 |
| 8,281,442 | B2 | | 10/2012 | Eggleston |
| 9,689,170 | B1 | * | 6/2017 | Lange ................... E04G 23/002 |
| 10,464,620 | B2 | * | 11/2019 | Arigoni ..................... G05D 1/08 |
| 10,518,830 | B2 | * | 12/2019 | Beard, III ............ B62D 57/024 |
| 2001/0013434 | A1 | * | 8/2001 | Hopkins .............. B62D 57/024 |
| | | | | 180/7.1 |
| 2003/0048081 | A1 | * | 3/2003 | Seemann ............... B62D 55/00 |
| | | | | 318/68 |
| 2003/0147493 | A1 | * | 8/2003 | Bueno .................... G01N 23/04 |
| | | | | 378/57 |
| 2013/0024067 | A1 | * | 1/2013 | Troy ......................... B64F 5/30 |
| | | | | 701/36 |
| 2014/0146132 | A1 | * | 5/2014 | Bagnato ................. G03B 37/04 |
| | | | | 348/36 |
| 2018/0001945 | A1 | * | 1/2018 | Arigoni .................. B62D 57/04 |
| 2019/0283821 | A1 | * | 9/2019 | Georgeson ........... B62D 57/024 |
| 2020/0030962 | A1 | * | 1/2020 | Georgeson ................ B08B 5/04 |
| 2020/0142052 | A1 | * | 5/2020 | Liu ..................... G01M 5/0075 |
| 2020/0182835 | A1 | * | 6/2020 | Hafenrichter ........ G01N 29/225 |

FOREIGN PATENT DOCUMENTS

| | | |
|---|---|---|
| CN | 208007135 U | 10/2018 |
| CN | 208041561 U * | 11/2018 |
| DE | 102008019680 A1 | 11/2009 |
| KR | 20130025526 A | 3/2013 |

OTHER PUBLICATIONS

Nielsen et al., "Reliable Automated NDT of Wind Rotor Blades", 11th European Conference on Non-Destructive Testing (ECNDT 2014), Conference Location: Prague, pp. 1-9, Oct. 6-10, 2014.

S.Hayashi et al., "Moving mechanism for a wind turbine blade inspection and repair robot", 2017 IEEE/SICE International Symposium on System Integration (SII), Conference Location: Taipei, pp. 270-275, 2017.

Fraunhoffer, "Automated Inspection of Rotor Blades", Robots: Humans' Dependable Helpers, Inspection of Rotor Blades *(RIWEA)—Fraunhofer IFF, pp. 1-5, Aug. 24, 2018.

* cited by examiner

ROBOTIC ACCESS SYSTEM INCLUDING ROBOTIC FAN CRAWLER FOR WIND BLADE INSPECTION AND MAINTENANCE

BACKGROUND

The embodiments described herein relate generally to wind turbines, and more specifically, to systems for inspecting and/or maintaining wind turbines.

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy to turn a shaft coupling the rotor blades to a gearbox, or if a gearbox is not used, directly to the generator. The generator then converts the mechanical energy to electrical energy that may be deployed to a utility grid.

Wind turbine blades are typically precisely designed and manufactured to efficiently transfer wind energy into rotational motion, thereby providing the generator with sufficient rotational energy for power generation. Blade efficiency is generally dependent upon the administration of routine maintenance over the life of the blade. More specifically, during operation, routine maintenance is required to address exterior blade debris (e.g., dirt, bugs, sea salt, etc.) collected on the external surfaces of the blades, thereby altering the shape and degrading the smoothness, and to address interior blade surface defects or interior blade debris (e.g., surface cracks, dirt, bugs, etc.) all of which may have an impact on blade efficiency.

Of concern herein is access to the internal and external surfaces of the wind turbine blades to perform certain inspection and maintenance tasks. Typically, external blade inspection and maintenance is performed manually via rope access, baskets or cranes. For example, using ropes, a blade technician is hoisted to a position adjacent to each blade via suspension from the tower, the hub, or a proximately located crane. The person then inspects, cleans, and provides maintenance to the blade. For example, the person may take pictures of the blades for later analysis or perform additional tests to determine a current condition of the blade surface. In addition, the person may proceed with any maintenance deemed necessary.

Access to the internal surfaces of the wind turbine blades to perform certain inspection and maintenance tasks, and more particularly the interior cavity of a wind turbine blade, is considered a permit-required-confined space and is deemed dangerous and uncomfortable to enter by humans. Further, for a human technician to enter the blade cavity of the wind turbine blade, the rotor must be stopped so that the blade to be inspected and/or maintained is positioned in the horizontal orientation, thus allowing the worker to crawl horizontally through the blade cavity. The size of the blade cavity rapidly constricts toward the tip of the blade, limiting human access to certain portions of the blade cavity. To provide for this horizontal blade orientation and access, the rotor must be turned multiple times to access all of the blades on a turbine and each rotation requires the human technician to leave the rotor hub, lift the lockout/tagout (LOTO), turn the rotor and restore the LOTO before returning to the hub to access the next blade.

Manual blade maintenance is time consuming and expensive and often results in the tasks being generally performed at longer than desired time intervals and/or wind turbine down-time, impacting overall efficiency. Consequently, wind turbines may operate in an inefficient manner for significant periods. In addition, environmental conditions may preclude the ability for humans to access the wind turbine to perform such tasks.

Accordingly, there is a need for a system and method for inspection and maintenance of a wind turbine, and in particular the internal and external surfaces of a wind turbine blade, that requires minimal human intervention. Further, there is a need for a system and method for inspection and maintenance a wind turbine blade that are relatively fast and efficient.

BRIEF DESCRIPTION

Aspects and advantages of the disclosure are set forth below in the following description, or may be obvious from the description, or may be learned through practice of the disclosure.

In one aspect, a robotic fan crawler configured to traverse a surface of a wind turbine and perform one or more tasks is provided. The robotic fan crawler includes one or more fans to adhere the robotic fan crawler to the surface of the wind turbine, one or more driving components to drive the robotic fan crawler along the surface of the wind turbine, one or more omnidirectional cameras and one or more steering components. The one or more omnidirectional cameras are operable to capture images of the surface from multiple perspectives during an inspection activity and data collection period. The one or more steering components provide directional changes of the robotic fan crawler during operation.

In another aspect, a robotic access system is provided. The robotic access system includes a robotic fan crawler configured to traverse a surface of a wind turbine and perform one or more tasks, a tether cable coupled to the robotic fan crawler, a tether management system coupled to the tether cable and a control system communicatively coupled to one or more of the robotic fan crawler and the tether management system. The robotic fan crawler includes one or more fans to adhere the robotic fan crawler to the surface of the wind turbine, one or more driving components to drive the robotic fan crawler along the surface of the wind turbine, one or more omnidirectional cameras and one or more steering components. The one or more omnidirectional cameras are operable to capture images of the surface of the wind turbine from multiple perspectives during an inspection tasks and data collection period. The one or more steering components provide directional changes of the robotic fan crawler during operation.

In yet another aspect, a robotic access system is provided. The robotic access system includes a self-propelled robotic fan crawler configured to traverse at least one of a sloped or non-sloped blade surface of a wind turbine and perform one or more tasks, a tether cable coupled to the robotic fan crawler, a tether management system coupled to the tether cable and a control system communicatively coupled to the robotic fan crawler. The tether cable provides one or more of power, communications, grounding, supplies and distance calculations. The self-propelled robotic fan crawler includes one or more suction fans to adhere the robotic fan crawler to the at least one of a sloped or non-sloped blade surface of the wind turbine, one or more driving fans to drive the robotic fan crawler along the at least one of a sloped or non-sloped blade surface of the wind turbine, one or more omnidirectional cameras, and one or more steering components. The one or more omnidirectional cameras are operable to capture images of the at least one of a sloped or non-sloped blade surface of a wind turbine from multiple perspectives during an inspection tasks and data collection period. The one or more steering components provide directional changes of the robotic fan crawler during operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

Corresponding reference characters indicate corresponding parts throughout the several views of the drawings.

DETAILED DESCRIPTION OF THE DISCLOSURE

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure enable robotic access to the internal and external surfaces of wind turbine blades without the need to turn the turbine's rotor during the inspection or maintenance tasks. In addition, embodiments of the present disclosure may minimize the need for human intervention in the inspection and maintenance of wind turbines. As a result, the disclosed robotic fan crawler, system and method may significantly lower inspection and maintenance costs.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a land-based wind turbine, for purposes of illustration, one of ordinary skill in the art will readily appreciate that embodiments of the present disclosure may be applied to any wind turbine structure, such as offshore wind turbines, and is not intended to be limiting to land based structures.

Figure 1:
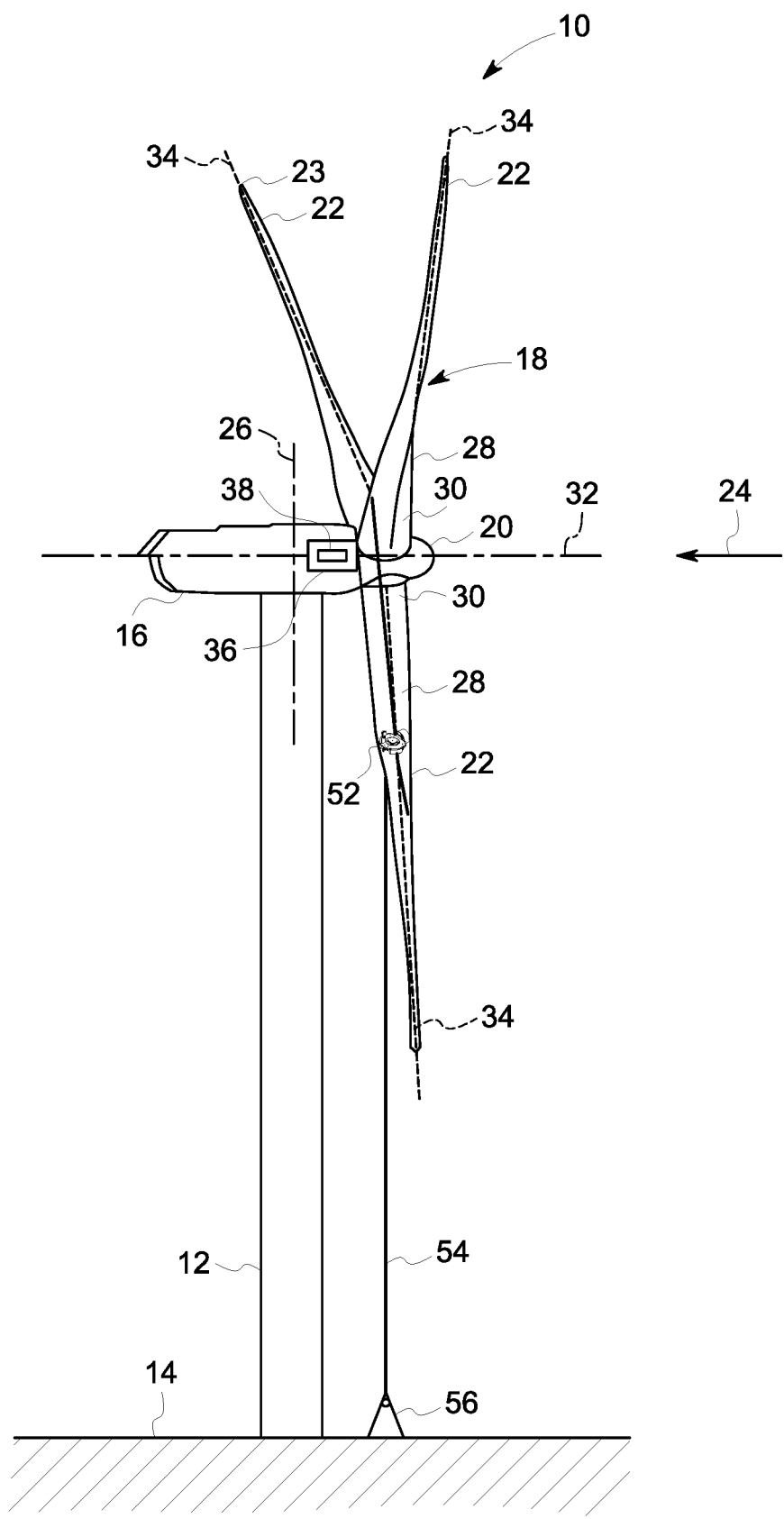
FIG. 1 is a side schematic view of an exemplary wind turbine including a robotic access system for wind blade inspection and maintenance, in accordance with one or more embodiments of the present disclosure.

Referring now to the drawings, wherein identical numerals indicate the same elements throughout the figures, FIG. 1 provides a schematic side view of an exemplary wind turbine 10. In the exemplary embodiment, wind turbine 10 is a horizontal-axis wind turbine. Alternatively, the wind turbine 10 may be a vertical-axis wind turbine. In the exemplary embodiment, the wind turbine 10 includes a tower mast 12 extending from and coupled to a supporting surface 14. The tower mast 12 may be coupled to the supporting surface 14 with a plurality of anchor bolts or via a foundation mounting piece (neither shown), for example. A nacelle 16 is coupled to the tower mast 12, and a rotor 18 is coupled to the nacelle 16. The rotor 18 includes a rotatable hub 20 and a plurality of rotor blades 22 coupled to the hub 20. In the exemplary embodiment, the rotor 18 includes three rotor blades 22. Alternatively, the rotor 18 may have any suitable number of rotor blades 22 that enables the wind turbine 10 to function as described herein. The tower mast 12 may have any suitable height and/or construction that enables the wind turbine 10 to function as described herein.

The plurality of rotor blades 22 are spaced about the rotatable hub 20 to facilitate rotating the rotor 18, thereby transferring kinetic energy from a wind force 24 into usable mechanical energy, and subsequently, electrical energy. The rotor 18 and the nacelle 16 are rotated about the tower mast 12 on a yaw axis 26 to control a perspective, or azimuth angle, of the plurality of rotor blades 22 with respect to the direction of the wind 24. Each of the plurality of rotor blades 22 are mated to the hub 20 by coupling a blade root portion 28 to the rotatable hub 20 at a plurality of load transfer regions 30. Each load transfer region 30 has a hub load transfer region and a blade load transfer region (both not shown in FIG. 1). Loads induced to the plurality of rotor blades 22 are transferred to the hub 20 via load the transfer regions 30. Each rotor blade 22 also includes a blade tip 23.

In the exemplary embodiment, each of the plurality of rotor blades 22 has a length of between approximately 30 meters (m) (99 feet (ft)) and approximately 120 m (394 ft). Alternatively, each of the plurality of rotor blades 22 may have any suitable length that enables the wind turbine 10 to function as described herein. For example, each of the plurality of rotor blades 22 may have a suitable length less than 30 m or greater than 120 m. As wind 24 contacts the rotor blade 22, blade lift forces are induced to the rotor blade 22 and rotation of the rotor 18 about an axis of rotation 32 is induced as the blade tip 23 is accelerated.

As the plurality of rotor blades 22 are rotated and subjected to centrifugal forces, the rotor blades 22 are also subjected to various forces and moments. As such, the plurality of rotor blades 22 may deflect and/or rotate from a neutral, or non-deflected, position to a deflected position. A pitch angle (not shown) of the plurality of rotor blades 22, i.e., an angle that determines the perspective of the rotor blade 22 with respect to the direction of the wind 24, may be changed by a pitch assembly (not shown in FIG. 1). Increasing a pitch angle of rotor blade 22 decreases blade deflection by reducing aero loads on the rotor blade 22 and increasing an out-of-plane stiffness from the change in geometric orientation. The pitch angles of the rotor blades 22 are adjusted about a pitch axis 34 at each rotor blade 22. In the exemplary embodiment, the pitch angles of the rotor blades 22 are controlled individually. Alternatively, the pitch angles of the rotor blades 22 are controlled simultaneously as a group.

During operation of wind turbine 10, the pitch assembly may change the pitch of rotor blades 22 such that the plurality of rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 38 configured to perform the tasks described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

The wind turbine 10 of the present disclosure may, during fabrication, assembly, operation, or otherwise, incur various indications. An indication 40 may be, for example, a crack, erosion, fouling, lightening damage or other defect on one or more of an exterior surface 62 (FIG. 2) and/or an interior surface 64 (FIG. 3) of the wind turbine 10, such as a surface of the rotor blade 22, a surface of the tower 12, or other component of the wind turbine 10. The indication 40, if not identified via inspection and repaired, or the blade, or portions thereof, upgraded, may cause damage to the various components of the wind turbine 10 or cause them to fail. For example, indications 40 in high load areas of the rotor blades 22 may, in some instances, need to be repaired before growing past approximately 50 millimeters ("mm") in length, while indications 40 in low load areas of the rotor blades 22 may need to be repaired before growing past approximately 3 meters ("m") in length.

To provide such inspection for indications 40 and maintenance to the wind turbine 10, disclosed herein is a robotic access system 50, including a robotic fan crawler 52, that provides for the robotic fan crawler 52 to access the exterior surface 62 and/or interior surface 64 of the rotor blade 22, or other surface of the wind turbine 10.

Figure 2:
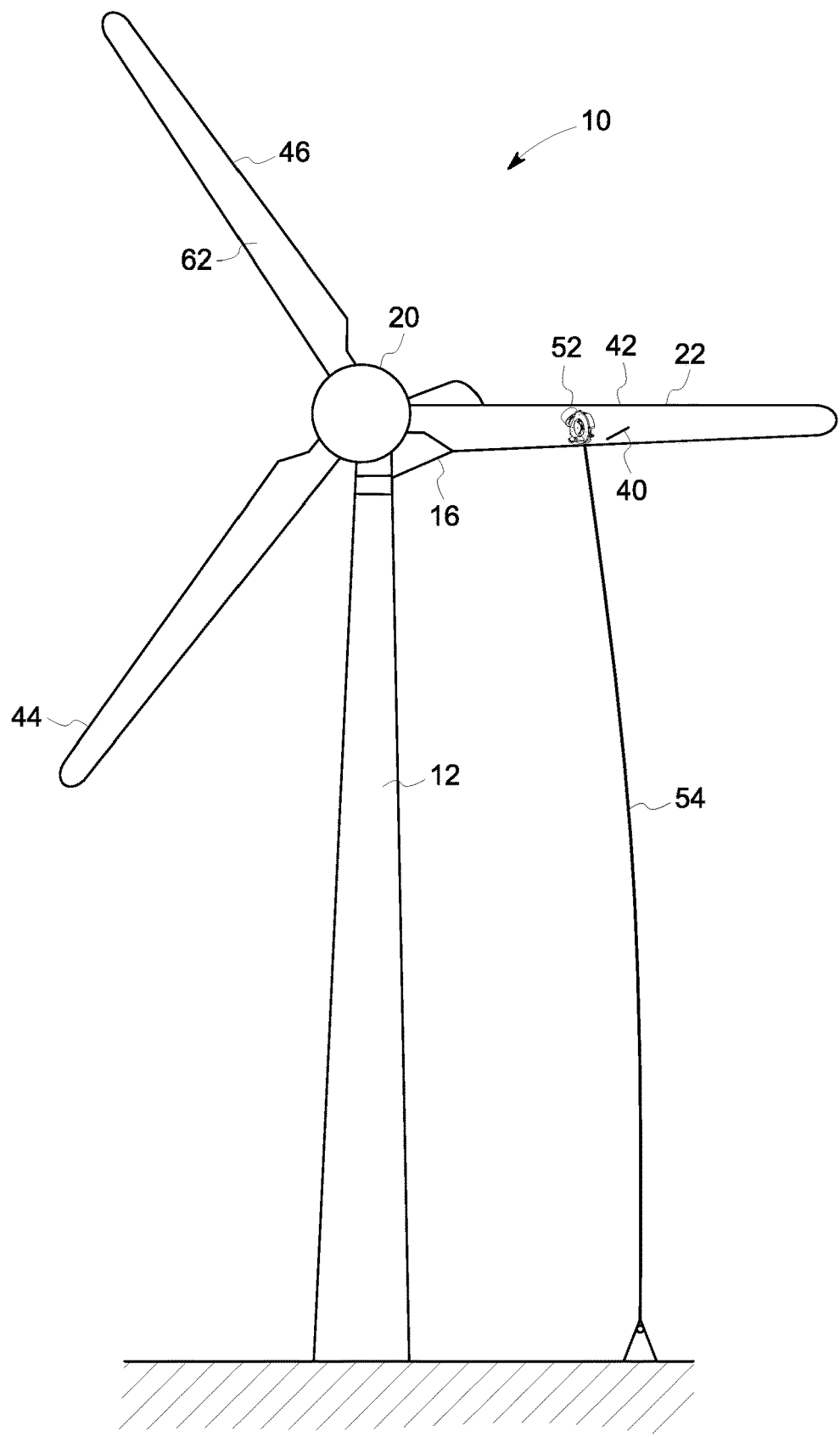
FIG. 2 is a perspective view of a portion of the wind turbine including a robotic access system for wind blade inspection and maintenance of FIG. 1 during use on an exterior surface of a wind blade, in accordance with one or more embodiments of the present disclosure.

As illustrated in FIGS. 1 and 2, in one embodiment the robotic access system 50, and more particularly, the robotic fan crawler 52 is positioned on the exterior blade surface 62 of the wind turbine 10, and namely proximate the blade 22. In an alternate embodiment, described presently, the robotic fan crawler 52 is positioned within an interior cavity (described presently) of the blade 22 and on the interior blade surface. In addition to the robotic fan crawler 52, the robotic access system 50 may include a tether cable 54 and a tether management system 56 as a safety mechanism, and to provide one or more of power, communications, grounding, supplies, distance calculation from a specific point, such as a root of blade, or the like, to the robotic fan crawler 52. As illustrated in FIGS. 1 and 2, in an embodiment, the robotic fan crawler 52 may be tethered to a base location, such as supporting surface 14, with the tether cable 54. In an embodiment, the tether cable 54 may provide any suitable components or systems for operating the robotic fan crawler 52.

During use, the robotic fan crawler 52 is positioned at the desired location for inspection and/or maintenance of the blade 22. In this particular embodiment, and as best illustrated in FIG. 2, a first rotor blade 42, of the plurality of rotor blades 22, is illustrated as being positioned in a substantially horizontal or non-sloped orientation. A second rotor blade 44 is illustrated as being positioned in an approximate 60° downhill position, and a third rotor blades 46 is illustrated as being positioned in an approximate 120° degree position, also referred to herein as a 60° uphill position. As previously alluded to, the robotic access system 50 allows access to the external blade surface 62 and internal blade surface 64 of the wind turbine blades 22 without the need to turn the plurality of rotors 22 to a specific orientation during the inspection or maintenance activities. Although first rotor blade 42, is illustrated as being in a horizontal orientation, the robotic fan crawler 52 is configured to access the second rotor blade 44 and third rotor blade 46, irrespective of the blade orientation. Eliminating a requirement for horizontal orientation of the rotor blade 22 to provide access obviates the need for the operators to leave the hub, lift the LOTO, rotate the rotor blades, restore the LOTO and re-enter the hub. With the plurality of rotor blades 22 initially parked with one blade in the horizontal orientation (zero degrees) as illustrated in FIG. 2, the other two blades 22 are orientated such that one is 60 degrees downhill and the other 60 degrees uphill from the hub 20. It should be understood that alternate blade positioning is anticipated by this disclosure and described presently.

The robotic fan crawler 52 is self-propelled, and much smaller than a human so for the horizontally oriented first rotor blade 42, the robotic fan crawler 52 traverses under its own power (as described presently) across the first rotor blade 42. In an embodiment, the robotic fan crawler 52 is attached by the tether cable 54 to the tether management system 56 located on the ground. In an alternate embodiment, the robotic fan crawler 52 is attached by the tether cable 54 to a tether management system located in the hub 20 (described presently). The tether cable 54 provides a means to ensure recovery of the robotic fan crawler 52, provide communication and power services to the robotic fan crawler 52, as well as providing a means to measure distance traveled for localizing the robotic fan crawler 52. The smaller size of the robotic fan crawler 52 allows it to travel farther along the exterior blade surface 62 in a direction away from the hub 20 than is possible for a human, increasing the amount of the blade 22 accessible for inspection and maintenance.

During operation, to access the 60 degree downhill blade 44, the robotic fan crawler 52 descends with the help of gravity and the tether management system 56 supports the weight of the robotic fan crawler 52, controlling descent speed and maintaining awareness of position. The robotic fan crawler 52 is retrieved through the use of the tether cable 54 pulling the robotic fan crawler 52 back up the blade 44 into the hub 20.

Likewise, to access the 60 degree uphill blade 46, the robotic fan crawler 52 must exert forces the allow it to carry its inspection or maintenance payloads as well as the weight of the tether cable 54 up a 60 degree slope that is fouled with dust, oil and loose debris. These contaminates make it challenging for a crawler with drive wheels to ascend such a slope reliably. The robotic fan crawler 52 makes use of a suction fan (described presently) to keep the robotic fan crawler 52 firmly attached to the surface that it is driving on and an additional fan(s) (described presently) to produce a thrust that allows the robotic fan crawler 52 to climb the slope. By using fans, the robotic fan crawler 52 is immune to contaminates that perturb traction. The tether cable 54 provides a tension that allows the robotic fan crawler's 52 position to be known precisely and controlled during ascent and descent.

The control system 36, in conjunction with the tether management system 56, as previously described, may be utilized to allow the robotic fan crawler 52 to automatically move through the plurality of rotor blades 22 in pre-defined paths and speeds to ensure appropriate access for inspection and maintenance. The control system 36 may be used to monitor a position of the robotic fan crawler 52 with regard to the hub 20 through the tether cable 54 and the tether management system 56 with regard to the proximity on the blade 22 using proximity sensors to follow a path relative to the blade features.

Employing the robotic fan crawler 52 enables access to each of the plurality of blades 22 without a human operator needing to break the plane that defines the boundary into the permit required confined space of the wind turbine 10, thereby obviating the need for permits. As rotating of the rotor blades 22 is not required for the robotic access system 50 to access each blade, there is no need for the operator to leave and enter the hub 20 multiple times, and therefore it is not necessary to lift and restore LOTO.

Figure 3:
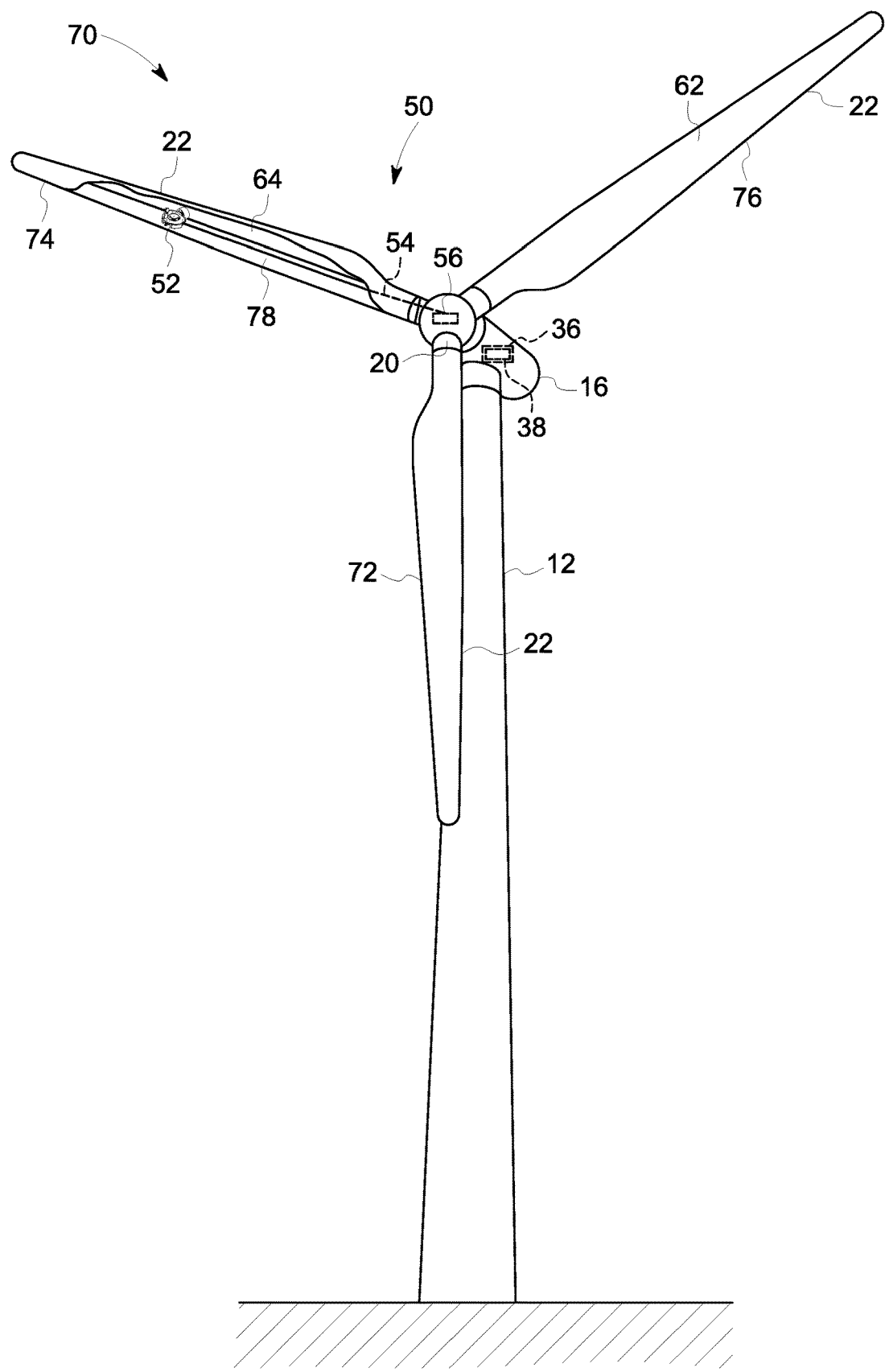
FIG. 3 is a perspective view of a portion of a wind turbine including a robotic access system for wind blade inspection and maintenance during use on an interior surface of a wind blade, in accordance with one or more embodiments of the present disclosure.
Figure 4:
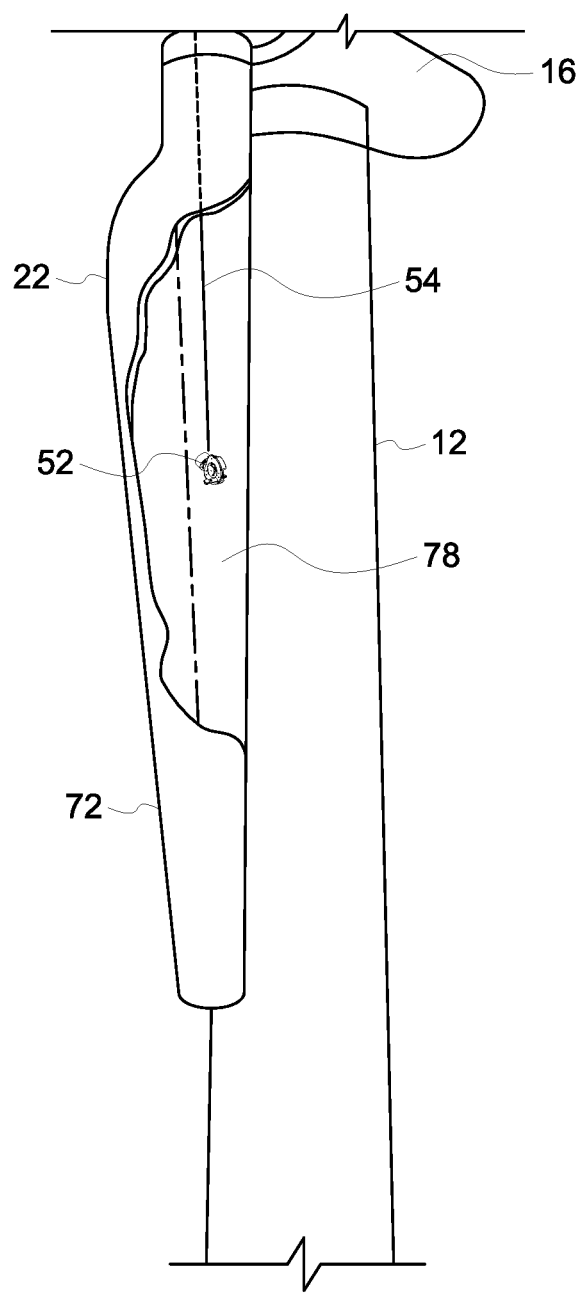
FIG. 4 is another perspective view of a portion of a wind turbine including the robotic access system for wind blade inspection and maintenance during use on an interior surface of a wind blade, in accordance with one or more embodiments of the present disclosure.

Referring now to FIGS. 3 and 4, illustrated is a wind turbine 70 including a plurality of rotor blades 22. In this particular embodiment, and as best illustrated in FIG. 3, a first rotor blade 72, of the plurality of rotor blades 22, is illustrated as being positioned in a substantially vertical or 90° orientation. A second rotor blade 74 is illustrated as being positioned in an approximate 150° uphill position, and a third rotor blade 76 is illustrated as being positioned in an approximate 210° uphill position. As previously alluded to, the robotic access system 50 allows access to the internal blade surface 62 and the external blade surfaces 64 of wind turbine blades 22 without the need to turn the plurality of rotor blades 22 during the inspection or maintenance activities. The robotic fan crawler 52 is configured to access any of the first rotor blade 72, the second rotor blade 74 and third rotor blade 76, irrespective of blade orientation. As previously indicated, eliminating a requirement for horizontal orientation of the rotor blade 22 to provide access obviates the need for the operators to leave the hub, lift the LOTO, rotate the rotor blades, restore the LOTO and re-enter the hub. It should be understood that alternate blade positioning is anticipated by this disclosure as previously described.

In this particular embodiment, the robotic fan crawler 52 is illustrated as traversing the interior of the second rotor blade 74 in FIG. 3, and the first rotor blade 72 in FIG. 4. The robotic fan crawler 52 is self-propelled and traverses under its own power (as described presently) within a cavity 78 defined in each of the rotor blades 22, illustrated by partial cutaway in FIGS. 3 and 4. In an embodiment, the robotic fan crawler 52 is attached by the tether cable 54 to a tether management system 56 located in the hub 20. In an alternate embodiment, the robotic fan crawler 52 is attached by a tether cable 54 to a tether management system 56 located on the ground (described previously). The tether cable 54 provides a means to ensure recovery of the robotic fan crawler 52, provide power and communication capabilities, as well as providing a means to measure distance traveled for localizing the robotic fan crawler 52. The smaller size of the robotic fan crawler 52 allows it to travel farther within the cavity 78 in the blade 22 than is possible for a human, increasing the amount of the blade 22 accessible for inspection and maintenance. In an embodiment, the robotic fan crawler 52 may provide for ~30-40% deeper inspection into the rotor blade 22 than a human.

During operation, to access the 150° degree uphill blade 74 of FIG. 3, the robotic fan crawler 52 must exert forces the allow it to carry its inspection or maintenance payloads as well as the weight of the tether cable 54 up a 150° degree slope that may be fouled with dust, oil and loose debris. The robotic fan crawler 52 makes use of a suction fan (described presently) to keep the robotic fan crawler 52 firmly attached to the surface that it is driving on and one or more additional fan(s) (described presently) to produce a thrust that allows the robotic fan crawler 52 to climb the sloped or non-sloped surface. By using fans, the robotic fan crawler 52 does not rely on traction and is thus immune to contaminates that perturb traction. The tether cable 54 provides a tension that allows the robotic fan crawler's 52 position to be known precisely and controlled during ascent and descent.

To access the 90° degree vertical blade 72 of FIG. 4, the robotic fan crawler 52 ascends with the help of gravity and the tether management system 56 supports the weight of the robotic fan crawler 52, controlling descent speed and maintaining awareness of position. The suction fan keeps the robotic fan crawler 52 attached to the surface of the vertical blade 72. In an embodiment, the robotic fan crawler 52 is retrieved through the use of the tether cable 54 pulling the robotic fan crawler 52 back up the blade 72 into the hub 20.

Figure 5:
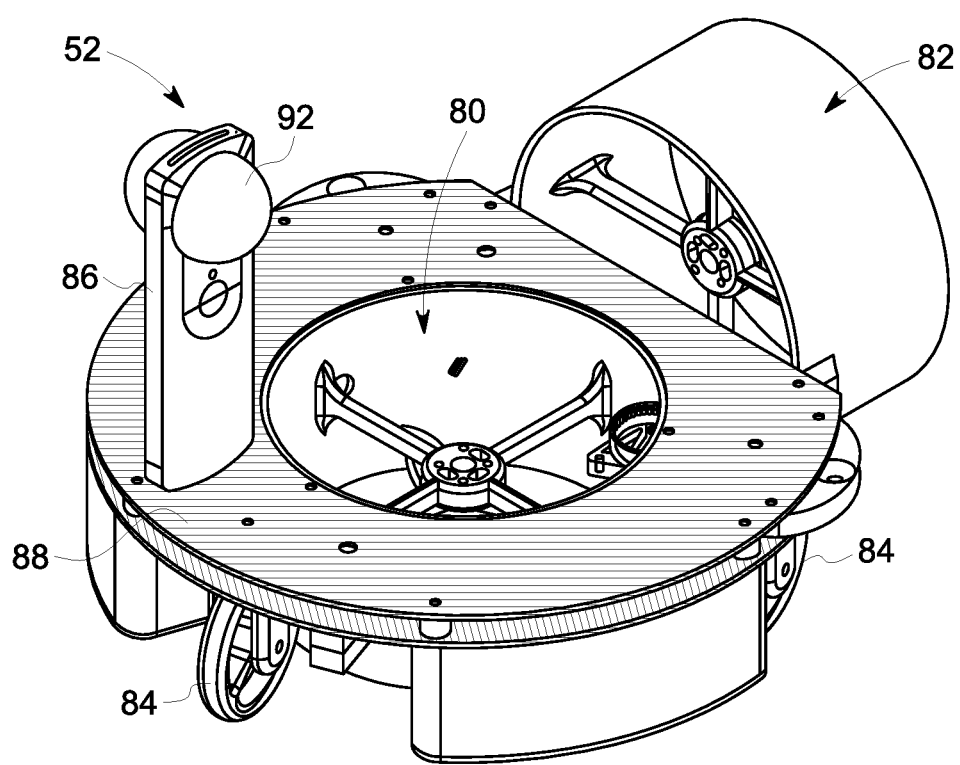
FIG. 5 is a schematic illustration of a robotic fan crawler for use in the robotic access system for wind blade inspection and maintenance of FIGS. 1-4, in accordance with one or more embodiments of the present disclosure.

Referring now to FIG. 5, illustrated is the robotic fan crawler 52 of the robotic access system 50. The robotic fan crawler 52 as previously described, is configured to traverse the rotor blade 22 under its own power. The robotic fan crawler 52 makes use of one or more suction fans 80 (of which only one is illustrated) to keep the robotic fan crawler 52 firmly attached to the surface that it is driving on and one or more driving components, and more particularly, one or more driving fans 82 (of which only one is illustrated) to produce a thrust that allows the robotic fan crawler 52 to traverse the surface of the rotor blade 22, such as to climb a sloped surface of the rotor blade 22. By using the one or more suction fan 80 and the one or more driving fans 82, the robotic fan crawler 52 is immune to contaminates on the surface of the rotor blade 22 across which it is traveling.

In an embodiment, the robotic fan crawler 52 includes a plurality of steering components 84, such as passive wheels, or the like, that provide directional changes during operation of the robotic fan crawler 52. In an embodiment, the robotic fan crawler 52 may include gimbal control for enhanced steering. The robotic fan crawler 52 further includes a frame 88 to support an omnidirectional camera system 86 that captures images of one or more surfaces of interest from multiple perspectives during an inspection activity and data collection period as the robotic fan crawler 52 traverses the surface. The captured images allow for the recreation of 3D models or "street-view"® style reconstructions of defects or indications for operators, inspectors and automated algorithms to interrogate in real-time or later offline, without concern that any possible defects or indications could have been missed during the data collection period. Optimized lighting in the form of an ability to turn one or more lights 92 OFF/ON may be included for image capture and navigation purposes. The robotic fan crawler 52 is configured for use by a human inspector to view areas of interest or can be used for automated defect recognition systems to detect defects autonomously.

In an embodiment, the robotic access system 50 is configured as a ruggedized system for field use and may perform a variety of tasks to provide fast, efficient, accurate inspection and/or maintenance, such as repair and/or upgrade of the wind turbine 10. Such tasks may include, but are not limited to, real-time inspection and maintenance, such as cleaning, sanding, grinding, coating application, filler application, tape application, or the like.

It should be understood that while specific tasks have been identified in the previous description, the tasks performed by the robotic access system 50 as identified are merely exemplary, and are not intended to be limiting, or indicate performance in a specific order. As intended, any number of tasks in any sequential order may be performed by the robotic access system 50 as required.

The robotic access system 50, and more particularly, a control system, such as the control system 36, is configured to operate the robotic fan crawler 52, and more particularly, the one or more suction fans 80, the one or more driving fans 82, the plurality of steering components 84, the omnidirectional camera 86, and/or any other components or systems of the robotic fan crawler 52. The control system 36 may be communicatively coupled to the processor 38. The communicative coupling of the various components of the robotic access system 50 and the processor 38 may be through a physical coupling, such as through a wire or other conduit or umbilical cord, including tether cable 54, or may be a wireless coupling, such as through an infra-red, cellular, sonic, optical, or radio frequency-based coupling. In an embodiment, the processor 38 may be incorporated into a suitable control system (not shown), such as a handheld remote, a personal digital assistant, cellular telephone, a separate pendant controller, or a computer. The robotic fan crawler 52 may be operated manually through the control system 36 by a human operator or may be partially or fully automated through the use of suitable programming logic incorporated into the processor 38 and/or control system 36.

The robotic fan crawler 52 may be configured to inspect for indications 40 and/or provide maintenance to the plurality of rotor blades 22, such as by repairing the indications 40 and/or provide upgrades to the blades 22. In an embodiment, the robotic access system 50 may provide inspection and/or maintenance to any other wind turbine 10 components, such as the tower 12. For example, in an exemplary embodiment, the robotic fan crawler 52 may inspect the tower 12 for indications 40. The robotic fan crawler 52 may thereafter perform maintenance tasks to repair the indication 40 and/or report the indication 40 for future repair.

In an embodiment, the robotic access system 50 may include locating capabilities to determine the location of an indication 40 detected on the rotor blade 22 by providing information regarding the location of the robotic fan crawler 52 when the indication 40 is detected and converting this information to information regarding the respective location of the indication 40 along the length of the rotor blade 22. The robotic access system 50 may, in exemplary embodiments, include measuring capabilities to measure the size of any indications 40 detected on the wind turbine 10, such as on a rotor blade 22. The robotic access system 50 may, in exemplary embodiments, include metering capabilities. The metering capabilities may indicate the distance that the robotic fan crawler 52 is from the rotatable hub 20, the ground, or any other wind turbine 10 component, when the indication 40 is detected. The robotic access system 50 may, in exemplary embodiments, include a global positioning system ("GPS") device or transmitter configured to utilize location data to determine the location of the robotic fan crawler 52, when the indication 40 is located.

In an exemplary embodiment, the tether cable 54 of the present disclosure may include safety features connecting the robotic fan crawler 52 to the wind turbine 10. In the event that the robotic fan crawler 52, while traversing an internal blade surface 62 or external blade surface 64 of the rotor blade 22, or other wind turbine surface, loses traction and becomes disengaged from the surface, the safety features may prevent the robotic fan crawler 52 from falling to the ground and becoming damaged or broken, a safety risk or damaging the tower.

It should be understood that the robotic access system 50 of the present disclosure may be optimized for fast, efficient inspection and/or maintenance of a wind turbine 10. For example, the robotic access system 50 of the present disclosure may be utilized to quickly and efficiently inspect, and/or maintain the various rotor blades 22 of a wind turbine 10 without the need to rotate the blades to any particular orientation. Additionally, it should be understood that the robotic access system 50 of the present disclosure eliminates human intervention, thus enabling quicker and more thorough inspection and/or maintenance of the blades due to access and lack of LOTO requirements, while reducing human errors previously associated with the inspection and/or maintenance of wind turbines 10. Further, it should be understood that the robotic access system 50 of the present disclosure can perform in a wide variety of environmental conditions.

Figure 6:
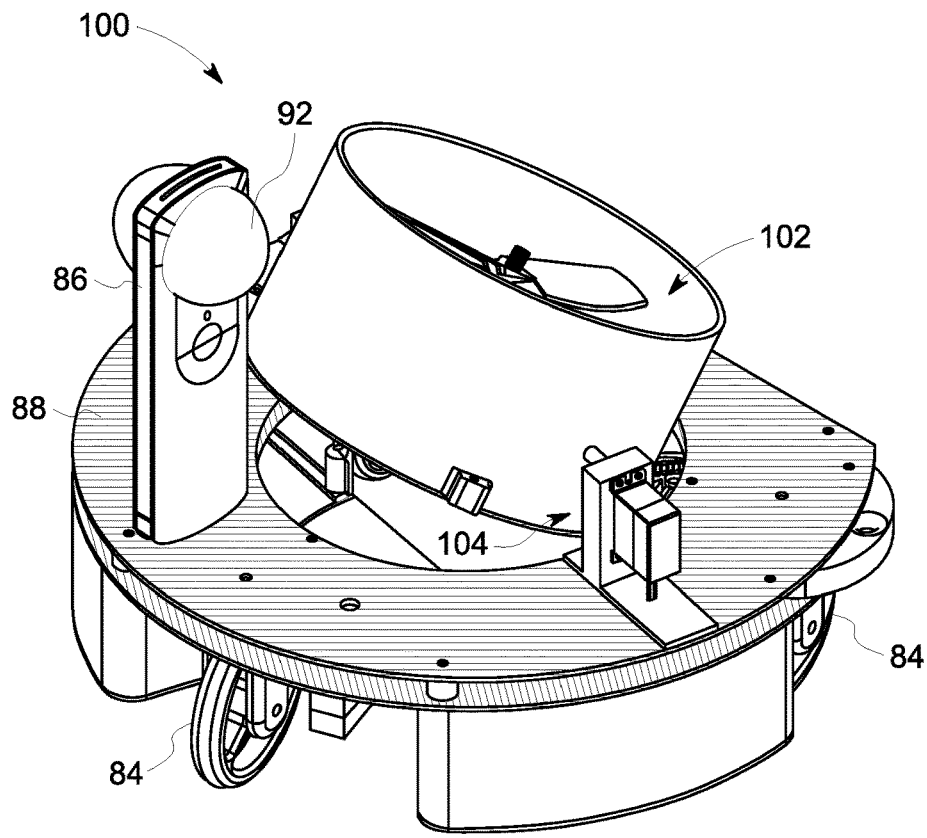
FIG. 6 is a schematic illustration of another embodiment of a robotic fan crawler for use in the robotic access system for wind blade inspection and maintenance of FIGS. 1-4, in accordance with one or more embodiments of the present disclosure.

Referring now to FIG. 6, illustrated is another embodiment of a robotic fan crawler 100, for use in the robotic access system 50 (FIGS. 1-4). The robotic fan crawler 100 is configured as a thrust vectoring fan crawler. Generally similar to the robotic fan crawler 52 previously described, the robotic fan crawler 100 is configured to traverse the rotor blade 22 (FIG. 1) under its own power. In this particular embodiment, the robotic fan crawler 100 makes use of a single fan 102, that serves as both a suction fan to keep the robotic fan crawler 100 firmly attached to the surface that it is driving on and a driving fan to produce a thrust that allows the robotic fan crawler 100 to traverse the surface of the rotor blade 22, such as to climb a sloped surface of the rotor blade 22. As illustrated the single fan 102 is oriented, such as by tilting relative to the frame 88 to provide both a downward suction force to stay on the surface the robotic fan crawler 100 is driving on, and a pushing force, and more particularly a thrust, to allow the robotic fan crawler 100 to traverse the surface of the rotor blade 22. Accordingly, a robotic fan crawler including at least one fan is anticipated by this disclosure.

In contrast to the previous embodiment, the single fan 102 of the robotic fan crawler 100 operates in conjunction with a thrust vectoring/pivoting mechanism 104 that provides orientation of the single fan 102 to redirect at least a portion of the airflow from a suction force that is directed normal to the surface that the robotic fan crawler 100 is positioned on to a thrust force directed in one or more planes other than normal to the surface that the robotic fan crawler 100 is positioned on, and serve as a driving component.

Similar to the previous embodiment, the robotic fan crawler 100 includes a plurality of steering components 84, such as passive wheels, or the like, that provide directional changes and/or crabbing control during operation of the robotic fan crawler 100. The robotic fan crawler 100 includes a frame 88 to support an omnidirectional camera system 86 that as previously described with regard to the robotic fan crawler 52.

The robotic fan crawler 100 may perform a variety of tasks to provide fast, efficient, accurate inspection and/or maintenance, such as repair and/or upgrade of the wind turbine 10. The robotic fan crawler 100 may be configured to inspect for indications 40 and/or provide maintenance a plurality of wind turbine 10 components, such as the plurality of rotor blades 22 or tower 12, such as by repairing the indications 40 and/or provide upgrades to the components.

Figure 7:
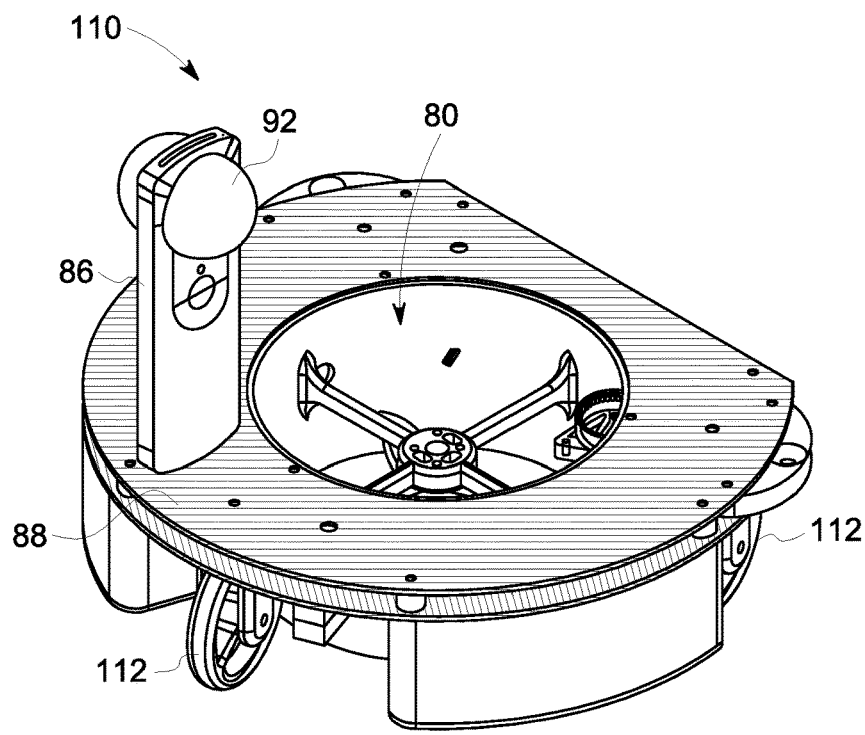
FIG. 7 is a schematic illustration of another embodiment of a robotic fan crawler for use in the robotic access system for wind blade inspection and maintenance of FIGS. 1-4, in accordance with one or more embodiments of the present disclosure.

Referring now to FIG. 7, illustrated is yet another embodiment of a robotic fan crawler 110, for use in the robotic access system 50 (FIGS. 1-4). The robotic fan crawler 110 is configured as a powered wheel fan crawler. Generally similar to the robotic fan crawler 52 previously described, the robotic fan crawler 110 is configured to traverse the rotor blade 22 (FIG. 1) under its own power. In this particular embodiment, the robotic fan crawler 110 makes use of a suction fan 80, generally similar to that described in the robotic fan crawler 52. The suction fan 80 serves to keep the robotic fan crawler 110 firmly attached to the surface that it is driving on.

Similar to the previous embodiments, the robotic fan crawler 110 includes a plurality of steering components 84 that serve as a driving component and provide directional changes during operation of the robotic fan crawler 110. In this particular embodiment, the steering components 84 are configured as powered wheels 112 that in addition to steering provide motion in the form of a pushing force, and more particularly a driving thrust, to allow the robotic fan crawler 110 to traverse the surface of the rotor blade 22, such as to climb a sloped surface of the rotor blade 22.

The robotic fan crawler 110 includes a frame 88 to support an omnidirectional camera system 84 that as previously described with regard to the robotic fan crawler 52. The robotic fan crawler 110 may perform a variety of tasks to provide fast, efficient, accurate inspection and/or maintenance, such as repair and/or upgrade of the wind turbine 10. The robotic access system 50, and more particularly, a control system, such as the control system 36, is configured to operate the robotic fan crawler 110.

The robotic fan crawler 110 may be configured to inspect for indications 40 and/or provide maintenance to the plurality of rotor blades 22, such as by repairing the indications 40 and/or provide upgrades to the blades 22. In an embodiment, the robotic access system 50 may provide inspection and/or maintenance to any other wind turbine 10 components, such as the tower 12. For example, in an exemplary embodiment, the robotic fan crawler 95 may inspect the tower 12 for indications 40. The robotic fan crawler 95 may thereafter perform maintenance tasks to repair the indication 40 and/or report the indication 40 for future repair.

Exemplary embodiments of the robotic access system for inspecting and/or maintenance of a wind turbine, and more particularly the robotic fan crawler, is described in detail above. The robotic access system is not limited to use with the specified land-based wind turbines described herein, but rather, the robotic access system 50 can be utilized with offshore wind turbines. In such an off-shore application, a base location may include a manned or unmanned ocean-based vehicle, or the like. Moreover, the present disclosure is not limited to the embodiments of the robotic access system and robotic fan crawler described in detail above. Rather, other variations of the robotic access system and robotic fan crawler may be utilized within the spirit and scope of the claims.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A robotic access system for climbing a sloped, interior surface of a blade of a wind turbine, the robotic access system comprising:

a robotic fan crawler configured to traverse and climb a sloped, interior surface of a wind turbine away from a base or hub, and perform one or more tasks, the robotic fan crawler comprising:

a suction fan comprising a pivoting mechanism to adhere the robotic fan crawler to the surface of the wind turbine, to drive the robotic fan crawler along the surface of the wind turbine, and to control a position of the robotic fan crawler;

one or more omnidirectional cameras operable to capture images of the surface of the wind turbine from multiple perspectives during an inspection tasks and data collection period; and one or more steering components that provide directional control of the robotic fan crawler during operation, a tether cable coupled to the robotic fan crawler;

a tether management system coupled to the tether cable; and a control system communicatively coupled to one or more of the robotic fan crawler and the tether management system;

wherein the tether cable provides a tension to control a position of the robotic fan crawler as the robotic fan crawler traverses and climbs the sloped, internal surface of the wind turbine; and wherein the control system determines the position of the robotic fan crawler, based at least in part on the tension, during ascent of the robotic fan crawler during operation.

2. The robotic access system of claim 1, wherein the tether management system is located at one of a base location or a hub of the wind turbine and wherein the tether cable is configured to provide one or more of power, communications, grounding, supplies and distance calculations.

3. The robotic access system of claim 1, wherein the one or more steering components are non-powered wheels.

4. The robotic access system of claim 1, wherein the fan is configured to provide both a suction force to adhere the robotic fan crawler to the sloped, internal surface of the wind turbine and a driving force to drive the robotic fan crawler along the sloped, internal surface of the wind turbine, wherein the pivoting mechanism to provides orientation of the fan to redirect at least a portion of an airflow from the suction force to the driving force, and wherein the one or more steering components are non-powered wheels that provide the directional control and also crabbing control of the robotic fan crawler.

5. The robotic access system of claim 1, wherein the one or more driving components are powered wheels to provide a driving force to drive the robotic fan crawler along the surface of the wind turbine.

6. The robotic access system of claim 1, wherein the robotic access system is configured for use by a human inspector to view areas of interest along the surface of the wind turbine.

7. The robotic access system of claim 1, wherein the robotic access system is configured to detect indications on the surface of the wind turbine autonomously.

* * * * *